(12) United States Patent
Gruel

(10) Patent No.: US 8,267,121 B2
(45) Date of Patent: Sep. 18, 2012

(54) VALVE ASSEMBLY FOR COUNTERACTING FLOW FORCES

(75) Inventor: Christopher Michael Gruel, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 596 days.

(21) Appl. No.: 12/010,986

(22) Filed: Jan. 31, 2008

(65) Prior Publication Data
US 2009/0193798 A1    Aug. 6, 2009

(51) Int. Cl.
*F16K 11/07* (2006.01)
(52) U.S. Cl. ......... 137/625.68; 137/625.35; 137/625.37; 137/625.38; 137/625.67; 137/1
(58) Field of Classification Search ............. 137/625.25, 137/625.67, 625.68, 625.33, 625.34, 625.35, 137/625.37, 625.38, 1; 251/366
See application file for complete search history.

(56) References Cited

U.S. PATENT DOCUMENTS

| | | | |
|---|---|---|---|
| 2,547,254 A * | 4/1951 | Braithwaite | 137/625.68 |
| 3,443,594 A * | 5/1969 | Frayer | 137/625.68 |
| 4,518,493 A * | 5/1985 | Badders | 210/432 |
| 4,586,539 A * | 5/1986 | Ueno | 137/625.38 |
| 4,616,671 A | 10/1986 | Steinkuhl et al. | |
| 4,622,992 A * | 11/1986 | Sutherland | 137/110 |
| 4,646,786 A | 3/1987 | Herder et al. | |
| 4,739,797 A | 4/1988 | Scheffel | |
| 4,791,958 A | 12/1988 | Brundage | |
| 5,031,663 A | 7/1991 | Fukuta et al. | |
| 5,069,420 A | 12/1991 | Stobbs et al. | |
| 5,271,430 A | 12/1993 | Muruyama et al. | |
| 5,911,245 A | 6/1999 | Weber | |
| 6,161,815 A | 12/2000 | Seddon | |
| 6,178,956 B1 | 1/2001 | Steinmann et al. | |
| 6,315,268 B1 * | 11/2001 | Cornea et al. | 137/625.68 |
| 6,328,674 B1 | 12/2001 | Matsue et al. | |
| 6,408,883 B2 * | 6/2002 | Motoki et al. | 137/625.68 |
| 6,598,622 B1 | 7/2003 | Reith et al. | |
| 6,655,653 B2 | 12/2003 | Walsh | |
| 6,718,763 B2 | 4/2004 | Maruta et al. | |
| 6,966,329 B2 | 11/2005 | Liberfarb | |
| 7,073,533 B2 * | 7/2006 | Bruck et al. | 137/625.68 |
| 7,790,084 B1 * | 9/2010 | Wapner et al. | 210/433.1 |

* cited by examiner

*Primary Examiner* — Craig Schneider
*Assistant Examiner* — Craig Price
(74) *Attorney, Agent, or Firm* — Finnegan, Henderson, Farabow, Garrett & Dunner LLP

(57) ABSTRACT

A valve assembly is disclosed. The valve assembly may include a housing having an interior chamber, inlet port, outlet port, and control port. The valve assembly may further include a valve member configured to move within the interior chamber to permit flow between the inlet port and the control port and between the outlet port and the control port. The valve assembly may further include and an actuator configured to move the valve member to form a first opening and second opening to create flow forces tending to close the first and second opening. The valve member may also include a passageway in the valve member configured to direct fluid flow from the inlet port to the control port and from the control port to the outlet port, and counteract the flow forces at the first and second opening.

19 Claims, 3 Drawing Sheets

VALVE ASSEMBLY FOR COUNTERACTING FLOW FORCES

TECHNICAL FIELD

The present disclosure relates generally to a valve assembly, and more particularly, to a valve assembly for counteracting flow forces.

BACKGROUND

Pressure control valves are primarily used to regulate fluid pressure applied to a downstream fluid-operated device. Proportional pressure control valves regulate fluid pressure proportional to an electric current supplied to an associated solenoid. Typically, pressure control valves include a high pressure port in communication with a supply passage, a low pressure port in communication with a tank, and a control port which delivers fluid under a pre-determined pressure to a fluid-operated device. The valve further includes a sliding spool, biased by a spring, and configured to open and close the various fluid passages. The spool assumes a position when the pressure at the control port and the spring force are balanced with a driving force which depends on a current level used to energize the solenoid.

Flow forces are natural phenomena in proportional pressure control valves. Flow forces, also referred to as Bernoulli's forces, result from the localized pressure drop in the small opening between the metering spool and the valve body. More specifically, as the fluid passes through the restriction in a fluid path, the velocity of the fluid increases. In the high velocity flow, the kinetic energy increases at the expense of the pressure energy, reducing the pressure adjacent the small opening. The localized pressure drop is attributed to inducing a pressure gradient across the body of the metering spool, and generates a flow force acting on the spool in the axial direction. The flow force tends to close the valve, thereby reducing the overall performance of the valve.

One method to control the flow forces was proposed in U.S. Pat. No. 6,655,653 B2 ("the '653 patent") issued to Walsh on Dec. 2, 2003. The '653 patent describes a valve assembly including a valve body defining first and second flow passages and a valve axially movable in the valve body to control fluid flow therebetween. The valve includes first and second control edges spaced axially and radially such that the valve includes a radially extending surface between the first and second control edges. First and second restrictions are thereby formed between the first and second control edges and the valve body. The first and second restrictions form an intermediate pressure region such that when the first and second flow passages are at different fluid pressures with the fluid flowing past the valve, the intermediate pressure regions act on the radially extending surface of the valve to cancel, or neutralizing the flow forces.

Although the valve assembly described in the '653 patent may counteract the flow forces tending to close the valve, the valve assembly described in the '653 patent does not allow for bi-directional flow. Furthermore, the valve assembly proposed may be more difficult to manufacture.

The valve assembly of the present disclosure is directed to improvements in the existing technology.

SUMMARY

One aspect of the present disclosure is directed towards a valve assembly. The valve assembly may include a housing including an interior chamber, an inlet port configured to supply fluid under pressure to the interior chamber, an outlet port configured to receive pressure from the interior chamber, and a control port in fluid communication with the interior chamber. The valve assembly may further include a valve member configured to move within the interior chamber to permit flow communication between the inlet port and the control port and between the control port and the outlet port; and an actuator configured to move the valve member in the interior chamber to form a first opening at the inlet port to create flow forces tending to close the first opening, and moveable to form a second opening at the outlet port to create flow forces tending to close the second opening. The valve member may also include at least one passageway in the valve member configured to direct fluid flow from the first opening at the inlet port to the control port and counteract the flow forces at the first opening tending to close the first opening, and configured to direct fluid flow from the control port to the outlet port and counteract the flow forces at the second opening tending to close the second opening. The valve member extending longitudinally from a first end proximate the control port to a second end proximate an actuator, where the valve member includes a transversely extending conduit positioned between, and spaced apart from, the first end and the second end. The plurality of passageways are positioned geometrically parallel to each other and extend from the first end to the transversely extending conduit, where each passageway of the plurality of passageways extend completely between the first end and the transversely extending conduit of the valve member.

Another aspect of the present disclosure is directed toward a method of counteracting flow forces in a valve assembly including a housing and a moveable valve member within the housing. The method may include moving the valve member is first direction forming an opening at an inlet port thereby creating flow force tending to close the opening at the inlet port, and directing fluid through the valve member between the inlet port and a control in the first direction to create forces that counteract the flow forces tending to close the opening at the inlet port. The method may further include moving the valve member in a second direction forming an opening at an outlet port thereby creating flow forces tending to close the opening at the outlet port, and directing fluid through the valve member between the control port and the outlet port in the second direction to create forces that counteract the flow forces tending to close the opening at the outlet port.

DETAILED DESCRIPTION

Figure 1:
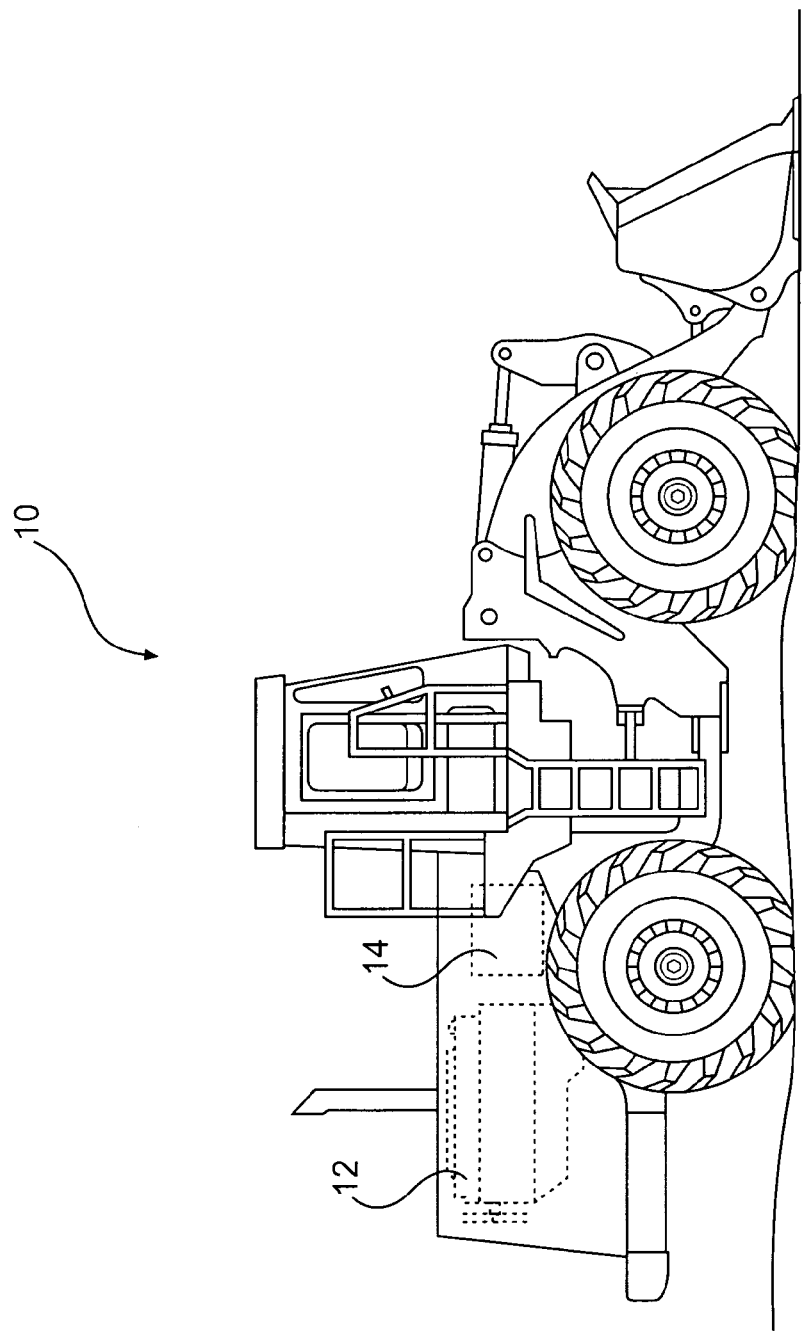
FIG. 1 is a side view diagrammatic illustration of a machine according to an exemplary disclosed embodiment.

FIG. 1 illustrates an exemplary machine 10. Machine 10 may be a mobile vehicle that performs some type of operation associated with an industry such as mining, construction, farming, transportation, or any other industry known in the art. For example, machine 10 may be an earth-moving machine such as a wheel loader, dozer, excavator, off-highway truck, backhoe, motor grader, or the like. Machine 10 may alternatively be a marine vessel, a passenger vehicle, or any other suitable mobile or stationary machine. Machine 10 may include a power source 12, and an associated hydraulic system 14, diagrammatically illustrated in FIG. 1.

Power source 12 may embody an engine, such as, for example a diesel engine, a gasoline engine, a gaseous fuel-powered engine such as a natural gas engine, or any other engine apparent to one skilled in the art. Power source 12 may also embody another source of power such as a fuel cell, a power storage device, or any other suitable source of power.

Figure 2:
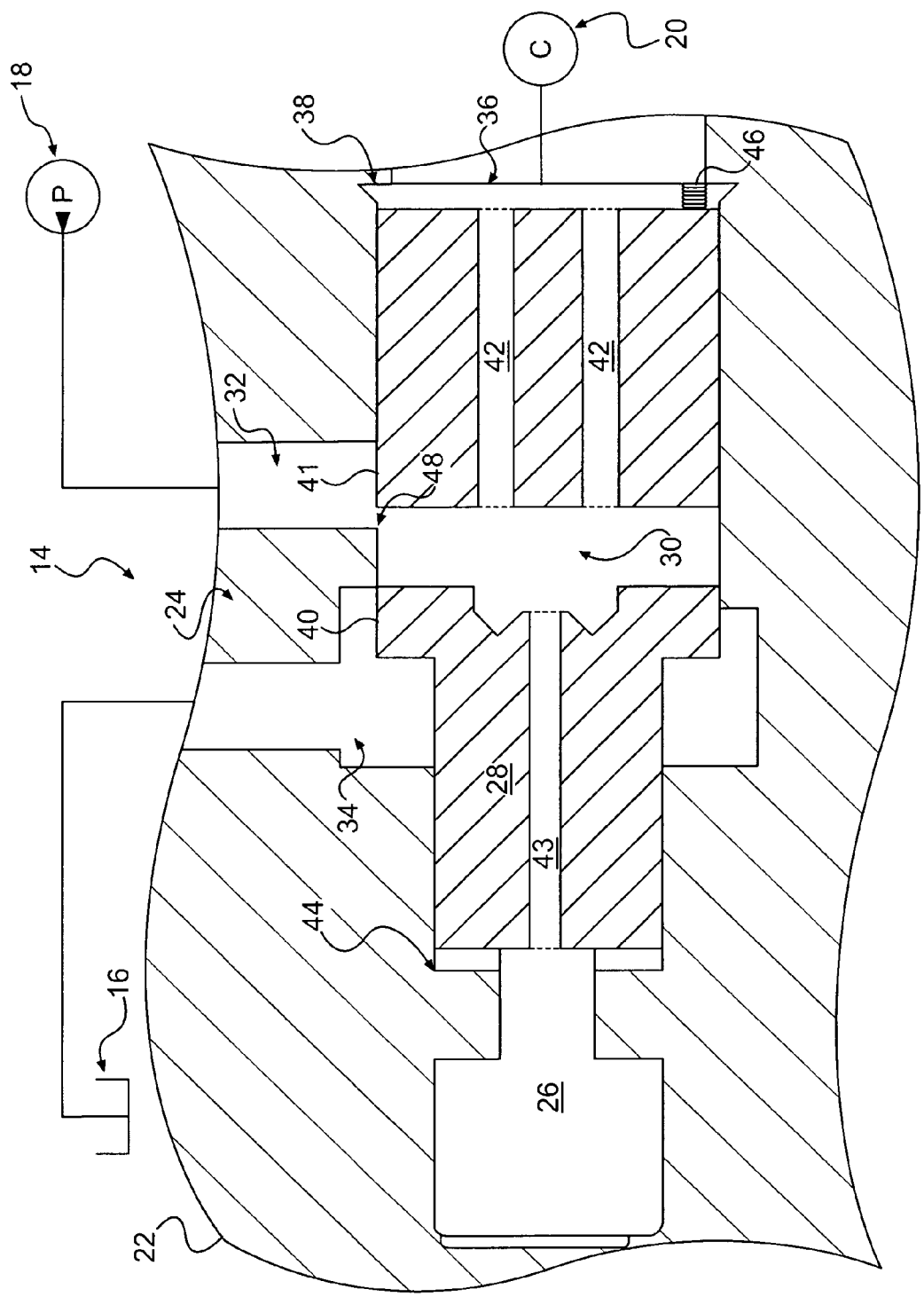
FIG. 2 is a diagrammatic illustration of the hydraulic system of FIG. 1, illustrating the valve assembly for fluid flow between an inlet port and a control port.
Figure 3:
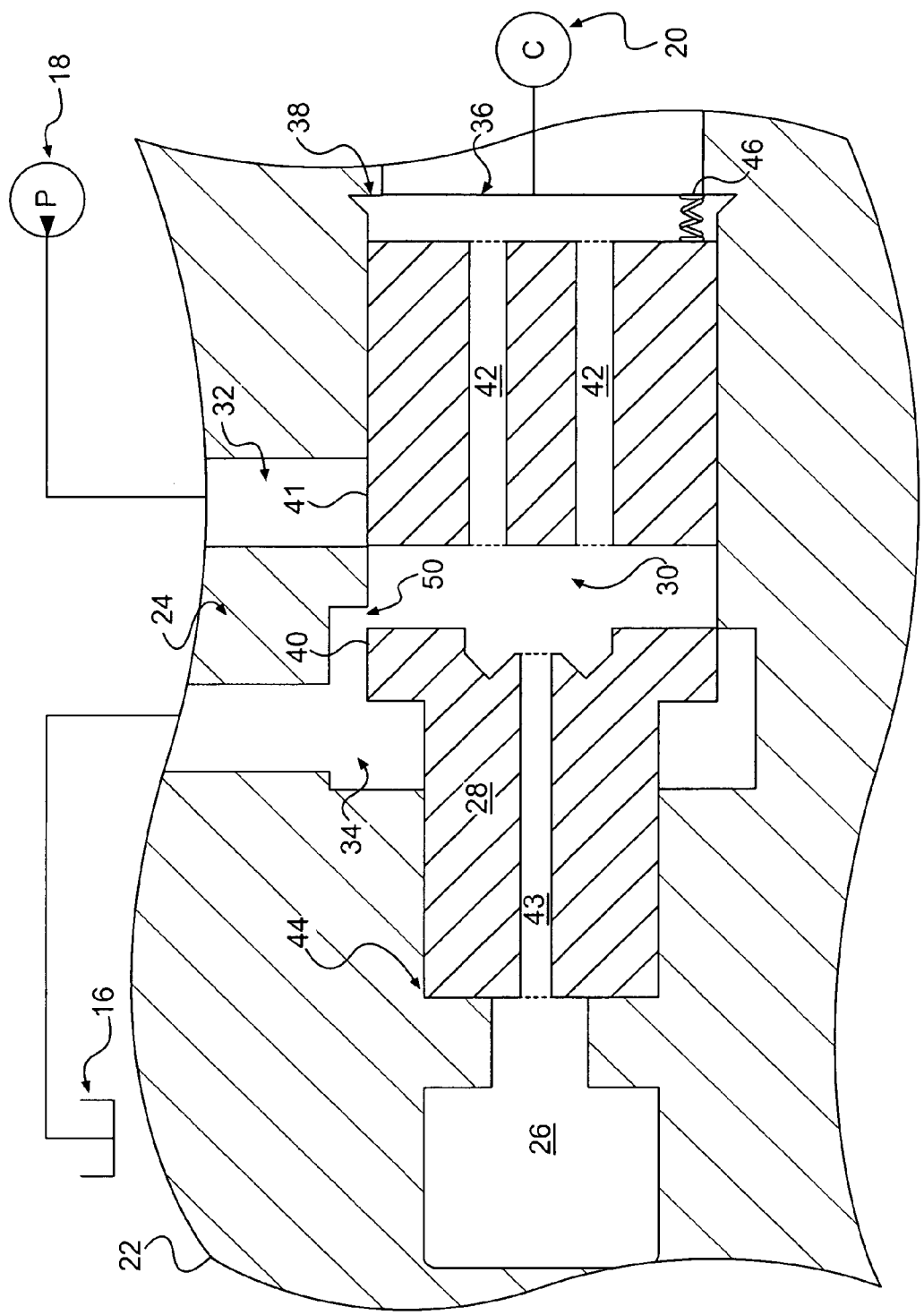
FIG. 3 is a diagrammatic illustration of the hydraulic system of FIG. 1, illustrating the valve assembly for fluid flow between the control port and a outlet port.

FIGS. 2 and 3 diagrammatically illustrate an exemplary embodiment of hydraulic system 14. In particular, hydraulic system 14 may include a lower pressure tank 16, a higher pressure source 18, a fluid operated device 20, and a valve assembly 22 fluidly connected to tank 16, source 18, and fluid-operated device 20. Fluid operated device 20 of hydraulic system 14 can be used in a brake system, a fuel system, a transmission system, or any other system of machine 10 contemplated by one skilled in the art.

Tank 16 of hydraulic system 14 may constitute a reservoir configured to hold a supply of fluid. The fluid may include, for example, hydraulic oil, an engine lubrication oil, a transmission lubrication oil, or any other fluid known in the art. One or more hydraulic systems 14 may be employed to draw fluid from and return fluid to tank 16. It is contemplated that hydraulic system 14 may be connected to multiple separate fluid tanks 16.

Source 18 of hydraulic system 14 may be configured to produce a flow of pressurized fluid and may include a pump such as, for example, a variable displacement pump, a fixed displacement pump, or any other source of pressurized fluid known in the art. Source 18 may be driveably connected to power source 12 of machine 10 by, for example, a countershaft, belt, electrical circuit, or in any other suitable manner. Alternatively, source 18 may be indirectly connected to power source 12 via a torque converter, gear box, or in any other manner known in the art. It is contemplated that multiple sources of pressurized fluid may be interconnected to supply pressurized fluid to hydraulic system 14.

Valve assembly 22 of hydraulic system 14 may be configured to deliver a pre-determined fluid pressure to fluid operated device 20. According to one embodiment, valve assembly 22 may be a proportional pressure control valve. For example, FIGS. 2 and 3 depict a portion of the proportional pressure control valve assembly for use in a hydraulic system 14. Valve assembly 22 may include a valve housing 24, an actuator 26 associated with valve housing 24, and a valve member 28 slidably disposed therein. Actuator 26 may be, for example, a solenoid.

With reference to FIGS. 2 and 3, valve housing 24 of valve assembly 22 may be an elongate, one-piece cylindrical construction, having an axial through bore defining an interior chamber 30. Valve housing 24 may include a plurality of ports positioned on the longitudinal axis of the housing 24 in flow communication with the interior chamber 30 of valve housing 24. In one embodiment, valve housing 24 may include an inlet port 32 and an outlet port 34. Inlet port 32 may be configured to provide flow communication between source 18 and interior chamber 30. Outlet port 34 may be configured to provide flow communication between tank 16 and the interior chamber 30. Valve housing 24 may further include a control port 36 in flow communication with first end 38 of the interior chamber 30 of valve housing 24. Control port 36 may be configured to deliver pressurized fluid to fluid operated device 20.

Valve member 28 may be slidably disposed within interior chamber 30 of valve housing 24 and configured to control fluid flow therein. Valve member 28 may have various designs and provisions for controlling fluid flow between inlet port 32, outlet port 34, and control port 36. In one embodiment, valve member 28 may be a spool type valve member having control surfaces 40, 41 that slide against the interior surface of valve housing 24 and present varying resistance to flow through interior chamber 30 as valve member 28 moves along the longitudinal axis. For example, control surfaces 40, 41 may cooperate with inlet port 32 and outlet port 34 to control fluid passage.

Valve member 28 may have at least one longitudinally extending orifice 42. In one embodiment, orifice 42 may be an elongate passageway disposed in the body of valve member 28, concentric with valve member 28. It is contemplated that orifice 42 may include various cross-sectional shapes. Orifice 42 may be located in the flow path between one of the inlet port 32 and outlet port 34 and the control port 36. Orifice 42 may be configured to provide a restriction in the flow path generating a pressure differential therein. It is further contemplated that a plurality of orifices 42 may be arranged in valve member 28. The plurality of orifices may be arranged symmetrically about the axis of valve member 28.

Valve member 28 may additionally include a bore 43 in the body of the valve member 28. Bore 43 may be configured to dampen the movement of the valve member 28 within interior chamber 30. Bore 43 may be further configured to communicate the pressure differential generated by orifice 42 to the portion of the valve member 28 located adjacent to actuator 26.

Actuator 26, received in a second end 44 of interior chamber of valve housing 24, may be configured to drive valve member 28 to a desired position to thereby control fluid flow through valve assembly 22. In one embodiment actuator 26 may be a solenoid actuator. Solenoid actuator 26 may be adapted to apply a force, proportional to the current level used to energize a coil (not shown) associated with actuator 26, to move valve member 28 to an infinite number of positions within interior chamber 30 of valve housing 24. In one embodiment valve housing 24 may include a spring 46, biasing valve member 28, to oppose the driving of actuator 26. In particular, spring 46, may be compressed when actuator 26 drives valve member 28 towards first end 38. Spring 46 may exert a force on valve member 28, which coupled with a pressure force at control port 36, may drive valve member towards second end 44 of interior chamber 30.

In one exemplary embodiment, actuator may drive valve member 28 to the position shown in FIG. 2. Specifically, actuator 26 may apply a force on valve member 28 to move valve member 28 towards first end 38 such that a first opening 48 is created between valve housing 24 and valve member 28 to allow fluid to flow in a first direction between inlet port 32 and control port 36. Valve member 28 is positioned such that outlet port 34 is substantially blocked to prevent fluid flow there through. Orifice 42 of valve member 28 may be downstream of first opening 48 and upstream of control port 36. Orifice 42 may be situated in the flow path between inlet port 32 and control port 36 such that fluid may flow therein.

In another exemplary embodiment, spring 46 may drive valve member 28 to the position shown in FIG. 3. For example, a high pressure at control port 36 coupled with the spring force associated with spring 46 may overcome the force applied by actuator 26 to drive valve member 28 towards second end 44. In an alternative embodiment, current supplied to the actuator 26 may be turned off to allow the spring force to drive valve member 28 towards second end 44. In such instances a second opening 50 is created between valve housing 24 and valve member 28 to allow fluid to flow in a second direction between control port 36 and outlet port 34. Valve member 28 is positioned such that inlet port 32 is substantially blocked to prevent fluid flow there through. In this exemplary embodiment, orifice 42 of valve member 28 may be downstream of control port 36 and upstream of second opening 50. Orifice 42 may be situated in the flow path between control port 36 and outlet port 34 such that fluid may flow through orifice 42.

INDUSTRIAL APPLICABILITY

The disclosed exemplary valve assembly may be applicable for any type of machine including a hydraulic system configured to control fluid flow. With the disclosed valve assembly, forces generated from the flow of pressurized fluid in the valve member, counteract the forces tending to alter the position of a valve member of the valve assembly.

In operation, according to the exemplary embodiment of FIG. 2, an electric current may be used to energized a coil (not shown) associated with actuator 26. Actuator 26 may be operable to drive valve member 28, proportional to the current, in an axial direction within interior chamber 30 to open inlet port 32 and allow fluid flow to control port 36. In particular, control surfaces 40, 41 of valve member 28 may slide along the interior surface of valve housing 24 to a position, determined by the force applied by actuator 26, and provide a first opening 48 at inlet port 32 between the valve member 28 and valve housing 24. Inlet port 32 may be fluidly connected to higher pressure source 18, and configured to provide pressurized fluid therethrough. Specifically, fluid may flow from source 18 through opening 48 at inlet port 32 into interior chamber 30. High velocity fluid flow through first opening 48 may create a localized pressure drop in first opening 48. The localized pressure drop may induce a pressure gradient across the body of valve member 28 which may generate a force, herein referred to as a flow force, on valve member 28. The flow force may act on valve member 28 in a direction that tends to close the valve.

Fluid in interior chamber 30, may be directed through at least one orifice 42 of valve member 28, to control port 36. Specifically, fluid may flow down the pressure gradient from inlet port 32 to control port 36 through orifice 42. Fluid flow through the restriction in the flow path provided by orifice 42 may create a pressure differential corresponding to a force. The force generated from the pressure differential across orifice 42 may be proportional to the rate of flow. The force generated from the pressure difference across orifice 42 may be applied to the valve member to partially, completely, or excessively counteract the force tending to close the valve at first opening 48. The valve member 28 extending longitudinally from a first end proximate the control port to a second end proximate an actuator, where the valve member includes a transversely extending conduit 30 positioned between, and spaced apart from, the first end and the second end. The plurality of passageways are positioned geometrically parallel to each other and extend from the first end to the transversely extending conduit, where each passageway of the plurality of passageways extend completely between the first end and the transversely extending conduit of the valve member.

Fluid pressure at control port 36 and spring 46 may be operable to drive valve member in an axial direction within interior chamber 30 to open outlet port 34, as shown in FIG. 3. Specifically, fluid pressure at control port 36 may apply a force on valve member 28 in the same direction as a force applied by spring 46 when compressed by actuator 26. At high fluid pressures at control port 36, the pressure force coupled with the spring force may be greater than the force applied by actuator 26 to drive the valve member to open outlet port 34 for fluid flow there through. Control surfaces 40, 41 of valve member 28 may slide along the interior surface of valve housing 24 to a position, determined by the force of spring 46 and the pressure force, and provide a second opening 50 at outlet port 34 between the valve member 28 and the valve housing 24. Outlet port 34 may be fluidly connected to a lower pressure tank 16, and configured to receive pressurized fluid.

Fluid may flow down the pressure gradient from control port 36 to outlet port 34. For example, fluid may flow from control port 36 through the restriction in the flow path provided by orifice 42 of valve member 28 and through second opening 50 at outlet port 34. The force generated in orifice 42 may be proportional to the rate of flow and in the direction of flow. The force generated by the pressure differential across orifice 42 may be applied to valve member 28 to partially, completely, or excessively counteract the flow forces generated at second opening 50 that tend to close the valve at the second opening.

One skilled in the art would recognize that multiple orifices 42 may be utilized to provide larger force counteracting flow forces generated at first and second openings 48, 50. Furthermore, one skilled in the art would recognize that the dimensions of orifice 42 may be manufactured such that the size of the restriction is proportional to the force desired to counteract the flow forces.

Valve assembly 22 may be used in a hydraulic system 14, for pressure control of a fluid operated device 20. Specifically, valve assembly 22 may allow for bi-directional flow, providing pressure control at a control port 36 in fluid communication with a fluid-operated device. Furthermore, valve assembly 22 may counteract flow forces tending to close the valve, thereby allowing the valve to maintain pressure accuracy over a wide range of flow rates. This may allow the creation of a high flow valve using a smaller actuating force.

It will be apparent to those skilled in the art that various modifications and variations can be made to the valve assembly of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being intended by the following claims.

What is claimed is:

1. A valve assembly, comprising:
a housing including an interior chamber;
an inlet port configured to supply fluid under pressure to the interior chamber;
an outlet port configured to receive fluid under pressure from the interior chamber;
a control port in flow communication with the interior chamber;
a valve member configured to move within the interior chamber to permit flow communication between the inlet port and the control port, and between the control port and the outlet port, the valve member extending longitudinally from a first end proximate the control port to a second end proximate an actuator, the valve member including a transversely extending conduit positioned between, and spaced apart from, the first end and the second end;
the actuator configured to move the valve member in the interior chamber to form a first opening at the inlet port and a second opening at the outlet port; and
a plurality of passageways in the valve member configured to direct fluid from the first opening to the control port and from the control port to the second opening, wherein the plurality of passageways are positioned geometrically parallel to each other and extend from the first end to the transversely extending conduit, wherein each passageway of the plurality of passageways extend completely between the first end and the transversely extending conduit of the valve member, and the plurality of passageways are arranged symmetrically about a longitudinal axis of the valve member.

2. The valve assembly of claim 1, wherein the inlet port is fluidly connected to a higher pressure source and the outlet port is fluidly connected to a lower pressure tank.

3. The valve assembly of claim 1, wherein the control port is configured to deliver pressurized fluid to a fluid-operated device.

4. The valve assembly of claim 1, wherein at least one passageway of the plurality of passageways includes a substantially uniform cross-section along substantially an entire length of the passageway.

5. The valve assembly of claim 1, further including a bore in the valve member, the bore extending longitudinally from the transversely extending conduit to the second end.

6. The valve assembly of claim 1, wherein the plurality of passageways are dimensioned to provide a force necessary to counteract the flow forces at the first opening and the second opening.

7. The valve assembly of claim 1, wherein the actuator is a solenoid.

8. The valve assembly of claim 7, further including a spring biasing the valve member against the driving force of the solenoid.

9. The valve assembly of claim 1, wherein the transversely extending conduit extends completely from one side of the valve member to an opposite side.

10. A method of counteracting flow forces in a valve assembly including a housing and a moveable valve member within the housing, the valve member extending longitudinally from a first end proximate a control port to a second end proximate an actuator, the valve member including a transversely extending conduit positioned between, and spaced apart from, the first end and the second end, the method comprising:
    moving the valve member in a first direction to form a first opening at an inlet port;
    directing fluid through a plurality of passageways in the valve member between the inlet port and a control port in the first direction, wherein the plurality of passageways are positioned geometrically parallel to each other and extend from the first end to the transversely extending conduit, wherein each passageway of the plurality of passageways extend completely between the first end and the transversely extending conduit of the valve member, and the plurality of passageways are arranged symmetrically about a longitudinal axis of the valve member;
    moving the valve member in a second direction to form a second opening at an outlet port; and
    directing fluid through the plurality of passageways of the valve member between the control port and the outlet port in the second direction.

11. The method of claim 10, wherein moving the valve member in the first direction includes activating the actuator to actuate the valve member in the first direction.

12. The method of claim 11, wherein the valve assembly further includes a spring to bias the valve member against a driving force of the actuator.

13. The method of claim 12, wherein the spring and pressure at the control port apply a force on the valve member tending to move the valve member in the second direction.

14. The method of claim 10, wherein directing fluid through the plurality of passageways includes directing fluid through each passageway of the plurality of passageways having a substantially uniform cross-section from the first end to the transversely extending conduit of the valve member.

15. The method of claim 10, wherein directing fluid through the plurality of passageways generates a pressure differential across the plurality of passageways.

16. A machine, comprising:
    a power source; and
    a hydraulic system including:
        a fluid source;
        a reservoir; and
        a valve assembly, including:
            a housing including an interior chamber;
            an inlet port configured to supply fluid under pressure from the fluid source to the interior chamber;
            an outlet port configured to receive fluid under pressure from the interior chamber to the reservoir;
            a control port in flow communication with the interior chamber;
            a valve member configured to move within the interior chamber to permit flow communication between the inlet port and the control port, and between the control port and the outlet port, the valve member extending longitudinally from a first end proximate the control port to a second end proximate an actuator, the valve member including a transversely extending conduit positioned between, and spaced apart from, the first end and the second end;
            the actuator configured to move the valve member in the interior chamber to form a first opening at the inlet port and a second opening at the outlet port; and
            a plurality of passageways in the valve member configured to direct fluid from the first opening to the control port and from the control port to the close the second opening, wherein the plurality of passageways are positioned geometrically parallel to each other and extend from the first end to the transversely extending conduit, wherein each passageway of the plurality of passageways extend completely between the first end and the transversely extending conduit of the valve member, and the plurality of passageways are arranged symmetrically about a longitudinal axis of the valve member.

17. The machine of claim 16, wherein the actuator is a solenoid.

18. The machine of claim 17, further including a spring biasing the valve member against a driving force of the solenoid.

19. The valve assembly of claim 9, wherein a cross-section of the transversely extending conduit is uniform from the one side of the valve member to the opposite side.

* * * * *